United States Patent [19]
Pasqualini

[11] Patent Number: 6,024,371
[45] Date of Patent: *Feb. 15, 2000

[54] BICYCLE OR MOTORCYCLE FRAME

[76] Inventor: Aureliano Pasqualini, Via ostolidi 27, I-33097 Spilimbergo, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,854

[22] Filed: Oct. 15, 1996

Related U.S. Application Data

[63] Continuation-in-part of application No. PCT/IB95/00034, Jan. 16, 1995, abandoned.

[30] Foreign Application Priority Data

Apr. 14, 1994 [IT] Italy .................................. PN94A0024

[51] Int. Cl.[7] .............................................. B62K 3/04
[52] U.S. Cl. ...................................... 280/281.1; 280/274
[58] Field of Search .................................. 280/274, 276, 280/279, 281.1, 277

[56] References Cited

U.S. PATENT DOCUMENTS

| | | | |
|---|---|---|---|
| 422,548 | 3/1890 | Thomas | 280/274 |
| 570,052 | 10/1896 | Price | 280/274 |
| 3,337,240 | 8/1967 | Rizzato | 280/274 |
| 3,847,409 | 11/1974 | Shaffer | 280/281.1 |
| 4,132,428 | 1/1979 | Lassiere | 280/278 |
| 4,995,627 | 2/1991 | Yun | |
| 5,011,172 | 4/1991 | Bellanca et al. | 280/281.1 |
| 5,271,635 | 12/1993 | Lu | 280/275 |
| 5,403,027 | 4/1995 | Hwang | 280/261 |

FOREIGN PATENT DOCUMENTS

| | | |
|---|---|---|
| 890247 | 2/1944 | France . |
| 1439508 | 4/1966 | France . |
| 72350 | 12/1952 | Netherlands . |

*Primary Examiner*—Paul N. Dickson
*Assistant Examiner*—Avraham H. Lerner
*Attorney, Agent, or Firm*—Brodwy and Nemark

[57] ABSTRACT

The frame of the bicycle or motorcycle of the invention, though using traditional components, through the geometrical arrangement of the frame and forks is able to transform the weight force and the thrust force on the pedals into kinetic energy of movement due to the law of gravitation of bodies. Thus the bodies' weights and masses, through the frame, give a thrust force which aids motion and which is added to the thrust force developed on the pedals or the thrust force of the motor of the motorcycle. Therefore the weight forces indicated in FIG. 2, create the forward pushing moments in the direction of motion, have poles in the hubs of the wheels. This system of forces also considers the tangential forces developed on the front wheel and the force created by air friction, which is opposed to the motion. In these frames it is also possible optimally to distribute the whole weight on the front and rear wheel, and constantly to have a gravitational force of the bodies applied to the frame aiding motion of the vehicle.

7 Claims, 2 Drawing Sheets

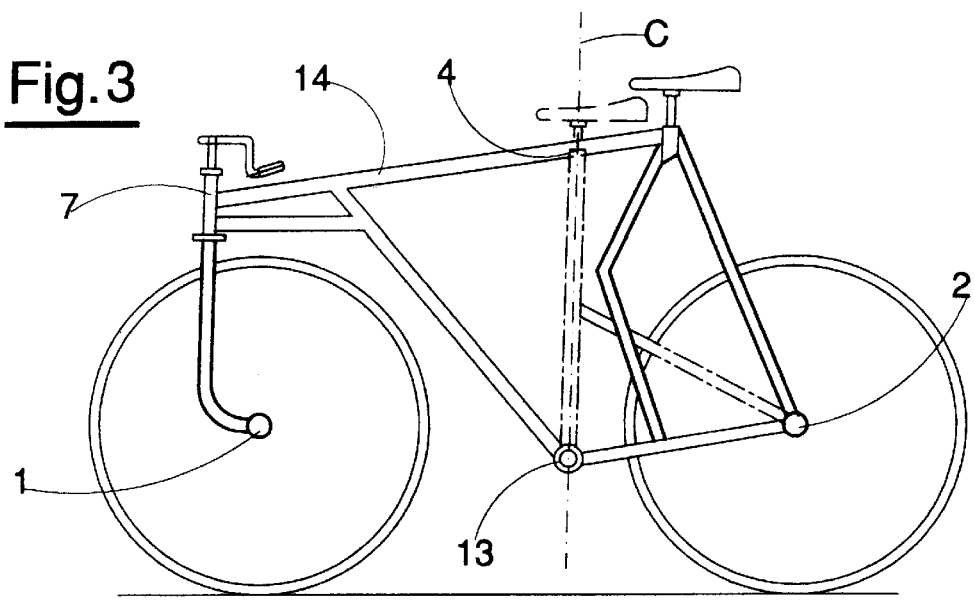
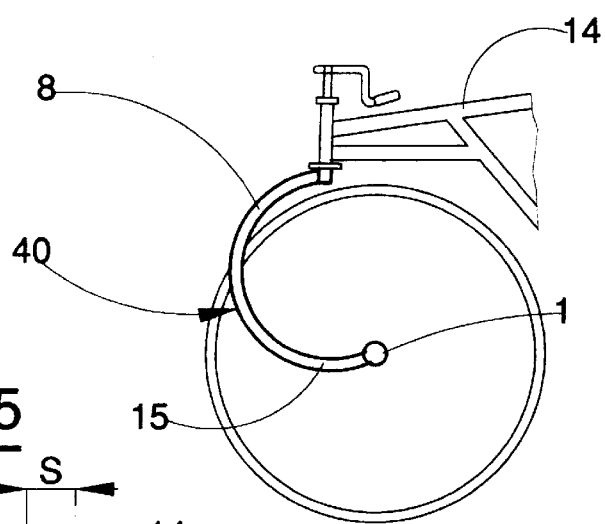
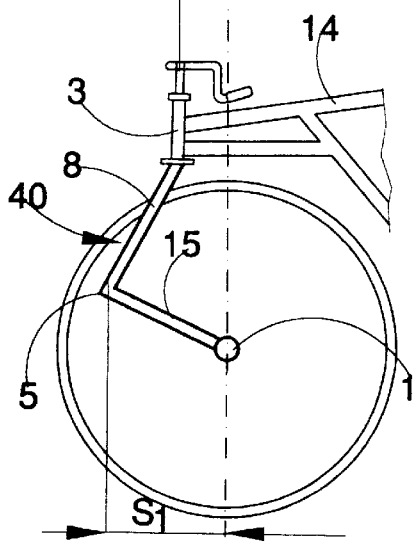
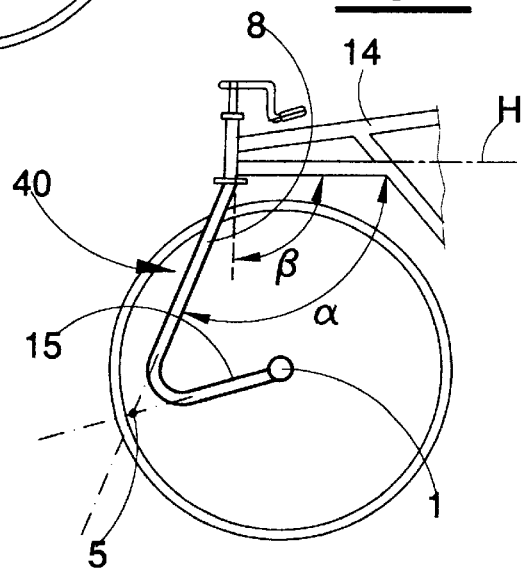

BICYCLE OR MOTORCYCLE FRAME

CROSS-REFERENCE TO RELATED APPLICATIONS

The present application is a continuation-in-part of international application PCT/IB95/00034, filed on Jan. 16, 1995, now abandoned, the entire contents of which, including all amendments made under Article 34, are hereby incorporated herein by reference.

BACKGROUND OF THE INVENTION

The present invention relates to a frame for bicycles or motorcycles, made of steel or light alloy. This frame differs from known frames in design, geometry and architecture and especially in that it takes advantage of the weight forces transforming them into dynamic moments. The invention is applicable to both the mechanical industry, in the manufacture of steel frames, and in the specialized cycle industry, using light alloys.

The invention is the fruit of studies in physics and mathematics, especially statics and dynamics. The frame exploits the law of gravitation of a body and the second principle of dynamics by which a force applied to a body which is free to move will produce an acceleration of said body. The frame also enables a rider to take up a better anatomical position.

Bodies in space are subject to the law of gravitation. A force having a distance from a stated point, in the case of a bicycle the hubs, creates a moment. The frame of the invention exploits the two above-described concepts, since the pushing moments, pushing forward and helping motion, are increased by raising the intensity of the applied forces, or by increasing the distances of the straight-line action of the forces from the stated point, also called the pole of the moment. The rider's weight rests partly on the handlebar (P2) and partly on the saddle (P1). The frame weight, the motor weight and the weight of all other parts forming the vehicle, indicated with (P4) rest throughout the frame partly on the point indicated with (4). The force originating from the thrust on the pedals also rests on the same points (3) and (4). Poin (3), where the head and the top tube meet, is a crossing point. Every weight force creates a reaction, which is equivalent and opposite (RA) and (RB) on the supports (1) and (2). Therefore this frame must have a point (3) at which the axis of the top tube (14) and the axis of the head tube (7) meet, at which all forces (P2) ($\approx\frac{1}{2}$P3), ($\approx\frac{1}{2}$P4) apply, and a point (4) at which the top tube (14) and the rear forks (9) meet, at which all forces (P1cos(w)) ($\approx\frac{1}{2}$MP3) ($\approx\frac{1}{2}$MP4) apply, respectively at a distance (S) and (T), in advance of the motion direction from the perpendiculars to the ground (A) and (B) passing through the hub (1) of the front wheel and the hub (2) of the rear wheel.

The direction of the weight forces, directed towards the ground and applied at point (3) for the front part, following the direction of the head tube (7) and the front forks (8) has to pass at a distance (S1) forward of the direction of motion from the hub (1) of the front steering wheel. The direction of the weight forces applied on point (4) for the rear part, following the rear forks (9) has to pass at distance (T1) in front of the hub (2) of the rear wheel. Distance (S1) must be equal or greater than distance (S), while distance (T1) can vary from point (2) to point (13) to avoid a forward overturn. The forward push increases with distances (S2), (S3) and (T2). If the distance is (T2) the rear fork (9) becomes the fork indicated by (31) and the weight force (P1) becomes the force indicated by (P1V). In frames having curved front forks (19), (29), the distances are calculated at the meeting point of the tangents at the angles, as shown in FIG. 1 and denoted by (21) and (30). The forces applied on point (3) are summed and become a force denoted by (F1), which force multiplied by distance (S1) creates the forward-pushing rotary moment (+2MS). The forces applied on point (4) add together to create a force indicated by (F2), which, multiplied by distance (T1) creates the rotary moment (+1MS). A rider's weight on the saddle (P1) is divided in accordance at angle (W) into force (P1cos(w)), which is perpendicular to the ground and the force Pisin (w) which has the same direction as the axis of the top tube (14). Force P1sin(w) at distance (17) form along its direction the force denoted by (F3), creating the pushing moment (+3MS). Force (F3) added to force (F1) creates a forwardly-directed resultant (R1), which still further increases the forward motion. In this way the frame can sum up all the forward-pushing moments having their pole in the hub (1) of the front wheel and in hub (2) of the rear wheel, due to the law of gravitation of bodies, summing up also the tangential forces (Y) developed on the wheels. This concept considers ground friction and air friction (X) as vehicle stabilizing forces.

More advantages can be obtained by changing the diameter of the front wheel and the rear wheel, by changing the shape and the geometry of the front and rear forks as shown in the drawing and indicated by (18), (19), (24), (25), (26), (27), (29), (31), or by a total or partial elimination of the frames parts indicated by (10), (11), (12), (28).

Known frames only partially or not at all transform the weight of the rider, of the frame itself, of the engine if there is one, of all other parts which form the vehicle, of the thrust of the pedals into kinetic energy. Certainly prior art frames are not based on this concept. Indeed, the direction of the rotary moment, which helps the forward push, produced by all the forces applied on the rear wheel (+1MS) is opposed to the direction of the rotary moments pushing backward on the front wheel (−2MS). This occurs because in such frames the weight forces application points (3) and (4) and the points (5) and (6) which denote the direction of forces (F1) and (F2) are between both perpendiculars to the ground (A) and (B) passing through the hubs (1) of the front wheel and (2) of the rear wheel. The concept of this invention is not even considered and exploited when the application point (3) lies behind the perpendicular to the ground (A) and the point (5) lies in front of the same perpendicular, or vice versa, inasmuch as this situation creates a backward pushing moment (−2MS); this occurs in the frames of U.S. Pat. No. 4,995,627 (Yun), Feb. 26, 1991, French patent 1,439,508 (Cesare Rizzato & C.S.N.C), Apr. 12, 1966, and Dutch patent 72,350 (Gra-Vemeijer et al.) May 15, 1953. The frame of Japanese patent publication 03 057 789 (Kimihiro Tsuchie) Mar. 13, 1991, (cf. Patent Abstracts of Japan, vol. 15 no. 212 (M-1118) May 30, 1991) has points (3) and (5) in front of the perpendicular (A) but has the direction of the forces (F1) following the front forks, which are turned backwards of an angle alpha; for this reason this frame cannot exploit the forward pushing moments and is suitable only for small bicycles, even though the fork rake is not traditional and the trail not well defined. French Patent 890,247 (Doderer), Feb. 2, 1944, is similar in the physical principle to Japanese patent 03 057 789 and therefore is not very manageable to ride, not based on the forward pushing moments concept and differs from the present invention also because this bicycle needs a turning arm and a fixed point to steer, on which the frame rests, indicated by (63) and (64) in figures (1) and (2). It also differs because, by steering, the hubs exit from the longitudinal axis, as shown in figure (5).

In figures (3) and (4) of the same patent it clearly emerges that this patent is not based on rotary pushing moments and its only object is to increase the fork and the trail.

SUMMARY OF THE INVENTION

The invention achieves the stated aims by providing a bicycle or motorcycle frame, comprising at least one top tube (14) and a head tube (7) which head tube (7) has an axis forming an internal angle β (i.e. internal to the frame) comprise between 90 degrees and 180 degrees with a horizontal axis (H) passing through said head tube (7), characterized in that a point (3) at which said head tube (7) and said at least one top tube (14) meet lies by a distance (S) forward; with respect to a motion direction of said frame, of a perpendicular (A) bisecting a hub of a bicycle front wheel mounted to said frame; in that a front fork of the frame, rotatably connected to said head tube (7) comprises one or more upper parts (8) joined to at least one lower part (15); said upper part (8) forming with said horizontal axis (H) an internal angle α (i.e. internal to the frame) comprised between 90 degrees and 180 degrees; said lower part (15) forming with the perpendicular (A) an angle (gamma) comprised between 0 and 180 degrees.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which:

FIG. 3 is a side elevation of a modified bicycle according to the invention.

FIG. 4 is a side elevation of a modified front fork.

FIG. 5 is a side elevation of a second modified front fork.

FIG. 6 is a side elevation of a third modified front fork.

DESCRIPTION OF THE PREFERRED EMBODIMENT

Figure 1:
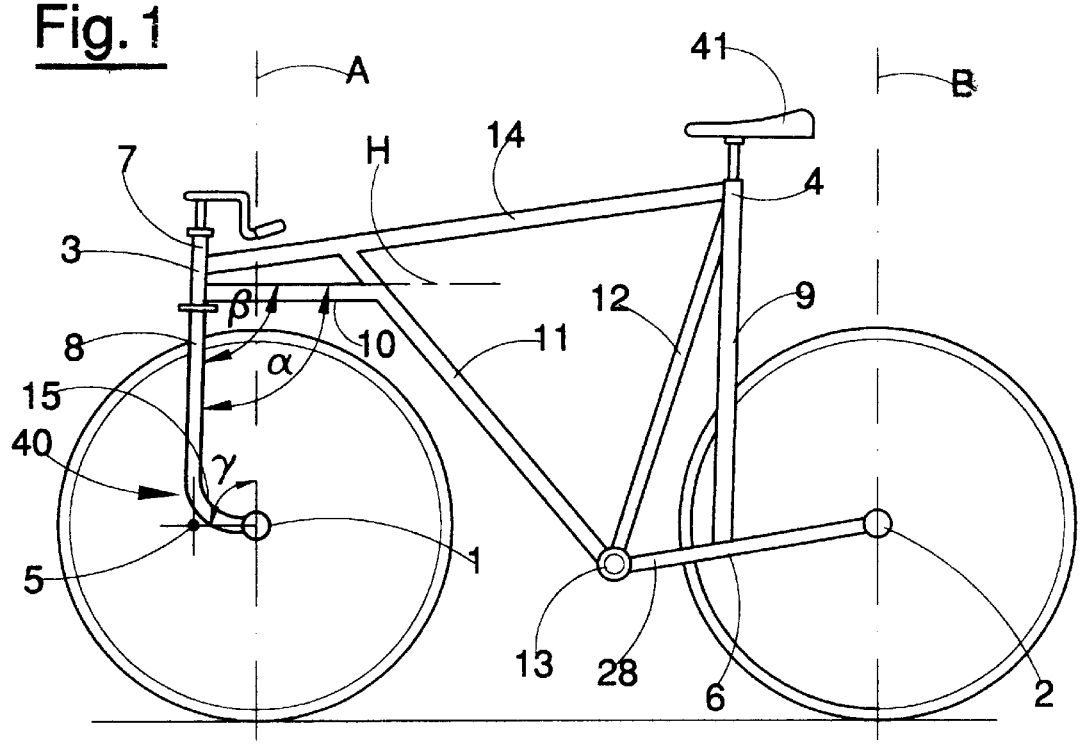
FIG. 1 is a side elevation of the bicycle.
Figure 2:
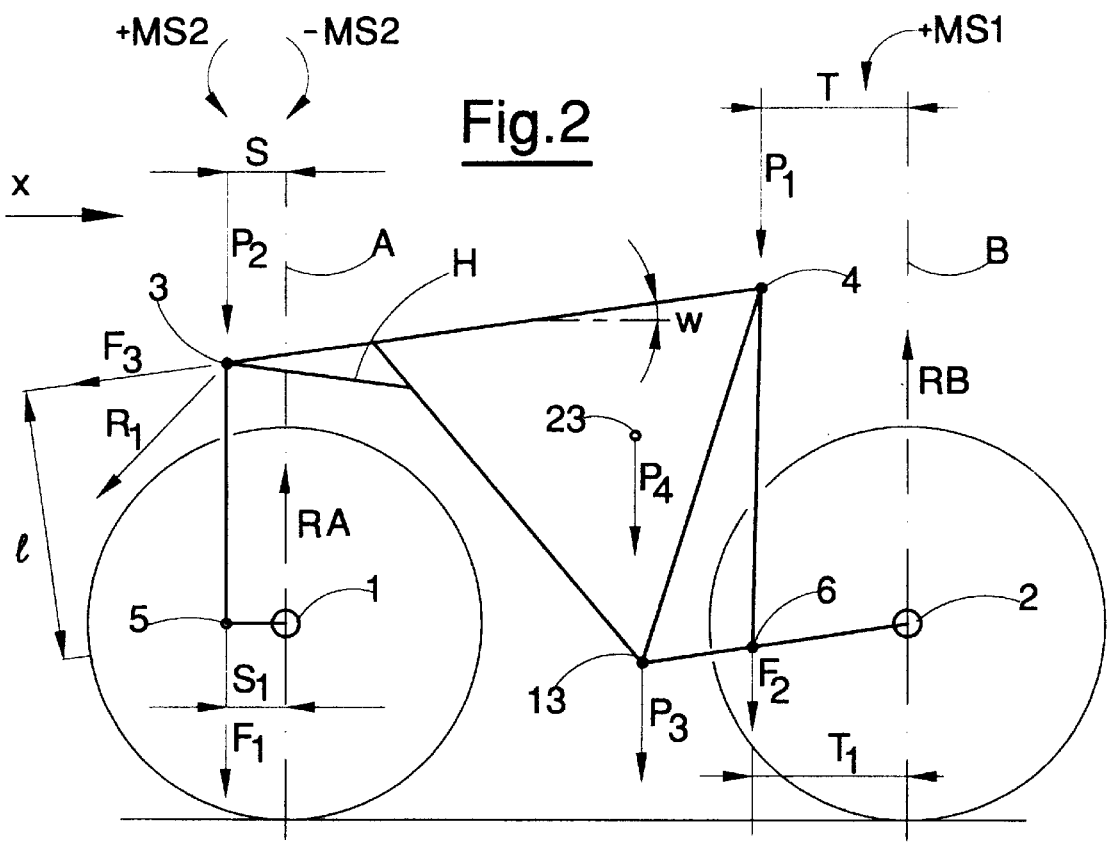
FIG. 2 is a schematical diagram showing the forces and moments applied to the bicycle of FIG. 1.

Some indispensable parts form the bearing structure of the frame, namely: at least one head tube (7), at least one front fork constituted by a first end rotatably connected to the head tube (7) and at least one upper part (8) and at least one lower part (15) which can exhibit any one of a number of shapes (8), (15), (18), (19), (29); at least one rear fork (9) constituted by at least one arm, configurations of which are denoted by (24), (25), (26), (27), (31); at least one top tube (14). Parts of the frame which are not indispensable are: down tubes (10), (11), seat tubes (12), and at least one tube as denoted by number (28). To calculate the direction of the directional forces, the head tube (7) and the upper part (8) of the front fork are considered as only one tube. To calculate the forces, the point (3) is given by crossing the axis of the top tube (14) with the axis of the head tube (7). The push forces (P3) which rest partly on point (3) and partly on point (4) are applied on the pedals (13). The weight forces of the frame and of the motor if there is one are indicated by (P4) and rest on points (3) and (4) and are applied on the baricenter of the frame (23). The front and rear forks can change in shape and geometry; some examples of front forks are shown in FIG. 1 and denoted by numbers (18), (19), (29). Examples of rear forks are shown FIG. 1 and denoted by numbers (24), (25), (26), (27), (31). The rider's position can change too, because the saddle can move from point (P1) to point (P1V), therefore the application point (4) moves in the direction of the front wheel (1). FIG. 2 schematically shows how the directional forces, produced by the weights and the push on the pedals are applied and act in one of the many frames which can be realized using the concept of the present invention. With reference to FIG. 1 of the drawings, which shows one of the many possible realizations of a frame for a bicycle and motorcycle it is important to consider that the more advanced application points (3) and (4) of weight forces (P1), (P2), (P3), (P4) are from the perpendiculars to the ground (A) and (B) passing through the hub (1) of the front wheel and the hub (2) of the rear wheel respectively, the more distant the directions denoted by (S1), (T1), (17) of forces (F1), (F2) (F3) are; consequently the pushing rotary moments (+1MS), (+2MS), (+3MS) favoring forwards motion are greater. The pushing rotary moments exploit the gravitation law of a body and are summed up to the tangential forces (Y) developed on the wheels. This system of forwardly-directed forces is opposed by the forces created by air friction (X) and ground friction, for which reason it is necessary to balance these forces to prevent the rider from pitching headlong together with the vehicle at low, medium and high speed, and whether riding on the flat, uphill or downhill.

The process for realizing the frame of the invention is traditional: materials used are also traditional. By changing the geometry of the frame, the angulation between the frame components varies in relation to the line constituting the ground and the typology and form of the front and rear forks also varies. In this way the effort required to drive the bicycle or motorcycle forward is reduced, even where inferior and heavier materials are used in the manufacture of the bicycle.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A frame for a bicycle or motorcycle having a motion direction, a rear wheel, and a front wheel including a wheel hub, the frame comprising:

a top tube (14);

a head tube (7) having a head tube axis forming a first angle β internal to the frame of between 90° and 180° with a horizontal line (H) passing through the head tube, the horizontal line being horizontal when the rear wheel and the front wheel are mounted to the frame and the resulting bicycle or motorcycle is on a level surface;

a front fork (40) rotatably connected to the head tube and comprising a head-tube part inside the head tube, at least one upper tine part (8) joined to at least one lower tine part (15), the front wheel being mountable thereon;

the upper tine part and the horizontal line forming a second angle a internal to the frame of between 90° and 180°;

wherein the head tube and the top tube meet at a crossing point (3), and the crossing point lies, with respect to the motion direction, a distance (S) forward of a vertical line (A) intersecting a mounting for the hub (1) of the front wheel; and wherein the lower tine part forms with the vertical line (A) a third angle γ internal to the frame of between 0° and 180°.

2. The frame according to claim 1, wherein a saddle-mount point at which the top tube meets a rear fork lies substantially in a vertical line with a pedal crank axis (13) when the rear wheel and the front wheel are mounted to the frame and the resulting bicycle or motorcycle is on a level surface.

3. The frame according to claim 1, wherein the top tube is inclined downwardly.

4. The frame according to claim 1, wherein the second angle α and the third angle γ are such that the upper tine part and the lower tine part are not collinear.

5. A frame for a bicycle or motorcycle having a motion direction, a rear wheel, and a front wheel including a wheel hub, the frame comprising:

a top tube (14);

a head tube (7) having a head tube axis forming a first angle β internal to the frame of between 90° and 180° with a horizontal line (H) passing through the head tube;

a front fork (40) rotatably connected to the head tube and comprising at least one tine upper part (8) joined to at least one tine lower part (15), the front wheel being mountable thereon;

wherein:

the head tube meets at least one top tube (14, 10) of the frame at a crossing point (3, 3a), and the crossing point lies under a line (X) which intersects the pedal crank axis (13) and which is superiorly tangential to the front wheel;

the upper part and the horizontal line form a second angle (α) internal to the frame of between 90° and 180°;

the crossing point (3) at which the head tube and the top tube meet lies, with respect to the motion direction, a distance (S) forward of a vertical line (A) intersecting a mounting for the hub (1) of the front wheel; and wherein the lower part internally forms with the vertical line (A) a third angle γ internal to the frame of between 0° and 180°.

6. In a frame for a bicycle comprising a head tube (7) having a substantially vertical axis; a front fork (8, 15) having an upper end rotatably connected to said head tube (7) along said axis of said head tube, and at least one lower part adapted to receive an axle of a front wheel for the bicycle; pedal crank support fixture (13) for rotatably supporting a pedal crank for rotation about a substantially horizontal axis; a down tube (10, 11) connected to and extending between said head tube (7) and said pedal crank support fixture (13); a rear-wheel fork (28) extending rearwardly from said pedal crank support fixture (13); said rear-wheel fork (28) having an end portion for supporting an axle of a bicycle rear-wheel; a seat tube for supporting a bicycle seat; and a downwardly projecting rear fork (9) extending from said seat tube downwardly to said rear-wheel fork (28), the improvement wherein said lower part of said front fork (8, 15) adapted to receive an axis of a front wheel for the bicycle is located rearwardly of said head tube (7), said pedal crank support fixture (13) has said substantially horizontal axis at a level lower than the lower part of said front fork for receiving an axis of a front wheel so that, in a bicycle assembled with said frame, the axis of the front wheel will be behind the head tube (7) and above the level of pedal crank axis, and said down tube (10, 11) is bent so as to provide at least an upper first section (10) connected to said head tube (7) which has a first angle of inclination, and a second lower section (11) having a greater angle of inclination from horizontal than said first section (10).

7. A bicycle comprising the frame of claim 6, a pedal crank supported by said fixture (13) having a pedal crank axis, and front and rear wheels respectively supported by the lower part of said front fork (8, 15) and the end portion of said rear wheel forks (28), wherein said front wheel and said rear wheel are of the same diameters or approximately the same diameters; and a straight line extending between the pedal crank axis and the location at which said head tube (7) and said down tube (10, 11) are connected passes through said front wheel.

* * * * *